United States Patent [19]

Peng et al.

[11] 4,022,733

[45] May 10, 1977

[54] GRAFT POLYMERIZATION PROCESS

[75] Inventors: Fred M. Peng, Longmeadow; William O. Dalton, Hampden, both of Mass.

[73] Assignee: Monsanto Company, St. Louis, Mo.

[22] Filed: June 25, 1975

[21] Appl. No.: 590,364

[52] U.S. Cl. .................. 260/29.7 UP; 260/29.7 T; 260/29.7 NQ; 260/23.7 A

[51] Int. Cl.² ...................... C08L 9/04; C08L 9/08; C08L 11/02

[58] Field of Search .............. 260/29.7 UP, 29.7 T, 260/29.7 NQ, 23.7 A, 880 R

[56] References Cited

UNITED STATES PATENTS

| | | | |
|---|---|---|---|
| 2,948,703 | 8/1960 | Schroeder | 260/880 R |
| 3,373,227 | 3/1968 | Finestone et al. | 260/880 R |
| 3,488,309 | 1/1970 | Cockbain | 260/23.7 A |
| 3,742,092 | 6/1973 | Duke et al. | 260/880 R |
| 3,879,496 | 4/1975 | Paxton | 260/880 R |

FOREIGN PATENTS OR APPLICATIONS 2,069,740  9/1971  France ............... 260/29.7 UP

*Primary Examiner*—M. J. Welsh
*Attorney, Agent, or Firm*—W. J. Farrington; J. C. Logomasini; S. M. Tarter

[57] ABSTRACT

Disclosed herein is a latex polymerization process for grafting styrene and acrylonitrile type monomers onto a rubber latex which has been stabilized with a substance which inhibits polymerization. The process involves carrying out the graft polymerization reaction in the presence of from 1 to 10 parts of latex seed particles per hundred parts of rubber using a chain transfer agent that doesn't inhibit the graft polymerization reaction.

12 Claims, 3 Drawing Figures

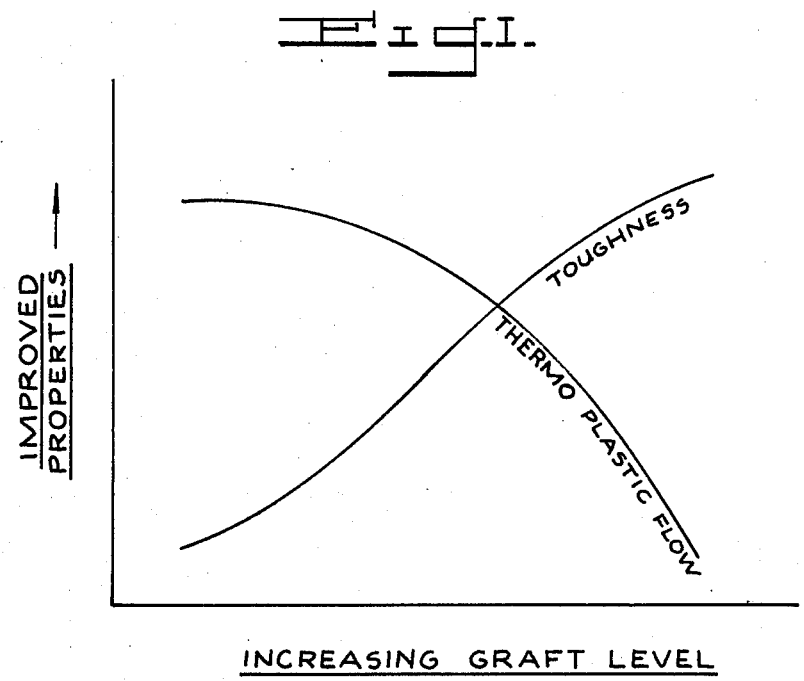
Fig. I.
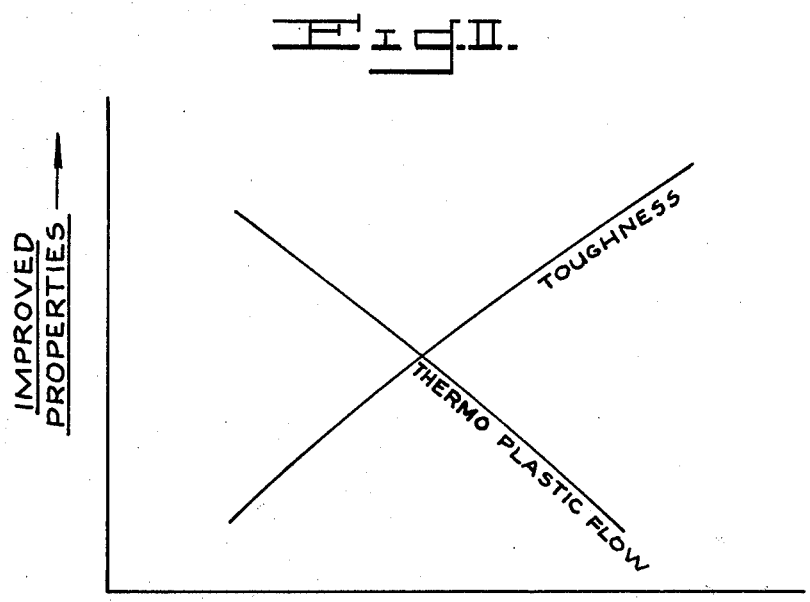
Fig. II.

Fig. III.
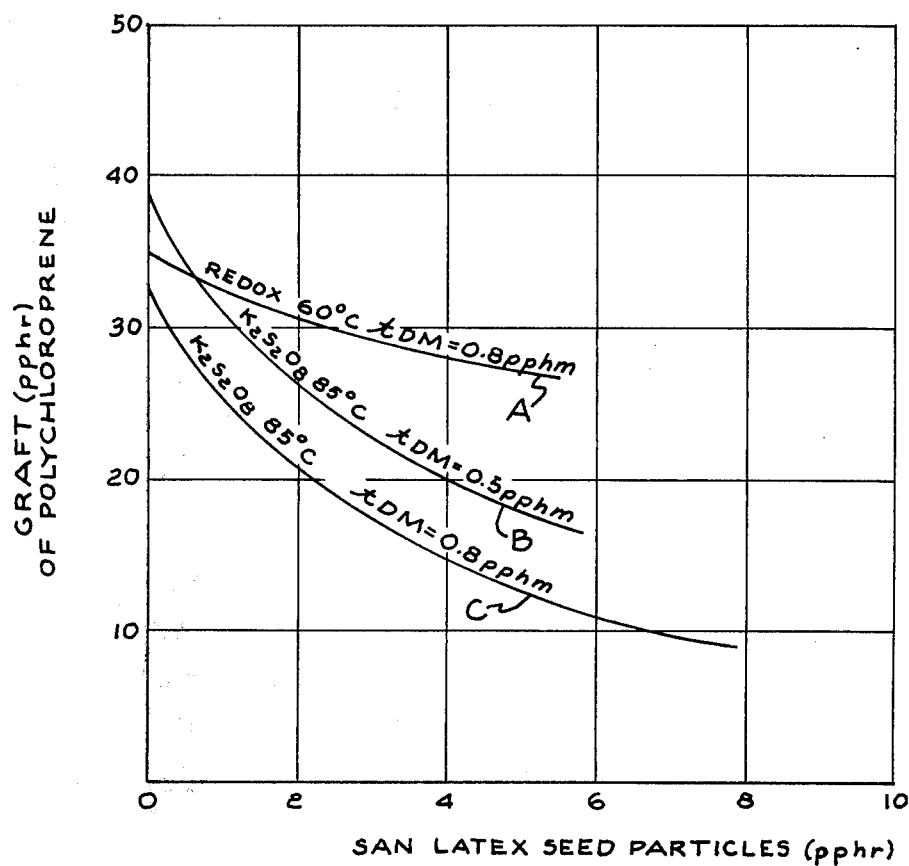

GRAFT POLYMERIZATION PROCESS

BACKGROUND OF THE INVENTION

1. Field of the Invention

This invention relates to a latex polymerization process for grafting styrene and acrylonitrile type monomers onto a rubber substrate in latex form. The process involves carrying out the graft polymerization reaction in the presence of latex seed particles.

2. Description of the Prior Art

Graft polymerization of monomers onto a preformed rubber substrate is known in the prior art as is evidenced by the teachings in U.S. Pat. Nos. 2,948,703, 3,373,227 and 3,742,092.

U.S. Pat. No. 2,948,703 teaches that the hot processability of ABS can be greatly improved by carrying out the graft polymerization in the presence of from 50 to 150 parts of seed per 100 parts of rubber.

U.S. Pat. No. 3,373,227 teaches the use of low molecular weight polystyrene particles in suspension polymerization in order to obtain improved flow properties in an ABS polymer.

U.S. Pat. No. 3,742,092 teaches the use of various seed particles (polystyrene, acrylonitrile/styrene, etc.) in the graft polymerization of methacrylonitrile and styrene onto a preformed rubber substrate for the purpose of improving the polymerization rates of methacrylonitrile.

It is conventional in the art to stabilize rubber latices with soaps. Some of these soaps such as tall oils, rosins and fatty acids, which have been saponified with ammonia, stabilize the rubber latex very effectively. However, these ammonium soaps inhibit the graft polymerization of styrene and acrylonitrile type monommers onto the rubber latex particles. As a result, the level of conversion of styrene and acrylonitrile type monomers to polymers is unacceptably low. In addition, the amount of polymer grafted onto the rubber substrate and the specific viscosity of the matrix polymer, i.e., the ungrafted polymer formed during the graft polymerization process, may also be unacceptable. This problem is further compounded when using conventional chain transfer agents such as terpinolene which also inhibits graft polymerization to some degree.

The use of mercaptan chain transfer agents which do not inhibit the polymerization, will give higher conversions of monomer to polymer. However, this gives rise to other problems in that the graft level of styrene and acrylonitrile type monomers onto the rubber substrate may be unacceptably high. With increasing graft levels, toughness of the polymeric product increases but its ability to be molded decreases (see FIG. I). The same holds true for an increase in the molecular weight of the matrix polymer (see FIG. II).

In acrylonitrile-butadiene-styrene graft polymers (ABS) the desired graft level for most commercial products is usually in the range of from 40 to 60 parts of SAN grafted onto 100 parts of polybutadiene rubber (pphr). Recently, considerably interest has been shown in replacing the polybutadiene rubber substrate with a polychloroprene rubber substrate in order to have a built-in halogen source in the polymer in order to obtain improved fire retardancy. The substitution of polychloroprene for the butadiene gives rise to new problems. The denser polychloroprene rubber, when grafted to a level of from 40 to 60 pphr, is increasingly resistant to flow. Thus, the graft levels which were desired in the polybutadiene based systems are unacceptably high for use in the polychloroprene based systems if good thermoplastic flow is to be obtained.

A need exists in the art for an improved graft polymerization process which can be used to graft styrene and acrylonitrile type monomers onto a polychloroprene rubber latex substrate which has been stabilized with a substance which normally inhibits polymerization of these type of monomers in order to provide grafted polymers with desired graft levels and matrix polymer with the desired specific viscosity.

In addition, a need exists in the art for a process which would provide grafted diene rubber compositions having good toughness and improved thermoplastic flow during melt processing and fabrication of these polymers.

DESCRIPTION OF THE DRAWINGS

FIG. I is a general diagram showing the effect of increasing graft level of styrene and acrylonitrile type monomers onto a diene rubber substrate on the properties of toughness and thermoplastic flow of the resulting composition. FIG. I illustrates that with increasing graft levels the toughness is improved while the thermoplastic flow of the polymer decreases. This indicates that it becomes increasingly more difficult to extrude and mold polymers having increasing graft levels.

FIG. II is a general diagram showing the effect of increasing molecular weight (specific viscosity) of the matrix polymer. FIG. II illustrates that with increasing specific viscosity in the matrix polymer the properties of toughness are improved while the thermoplastic flow of the polymer decreases. This indicates that polymer compositions having matrices with increasing specific viscosity are more difficult to extrude and mold.

FIG. III is a plot of percent graft versus the amount of SAN latex seed particles used in the graft polymerization of SAN onto polychloroprene. The amount of SAN grafted onto the polychloroprene rubber and the amount of SAN latex seen particles used are expressed in parts per hundred parts of rubber.

Curve A represents the results obtained using a diisopropylbenzene hydroperoxide/sodium formaldehyde sulfoxylate redox polymerization initiator, 0.8 parts per hundred parts of monomer (pphm) of a tertiary dodecyl mercaptan (tdm) chain transfer agent and a polymerization temperature of 60° C.

Curve B represents the results obtained using potassium persulfate as the polymerization initiator, 0.5 parts per hundred parts of monomer (pphm) of a tertiary dodecyl mercaptan (tdm) chain transfer agent and a polymerization temperature of 85° C.

Curve C represents the results obtained using potassium persulfate as the polymerization initiator, 0.8 parts per hundred parts of monomer (pphm) of a tertiary dodecyl mercaptan (tdm) chain transfer agent and a polymerization temperature of 85° C.

FIG. III is discussed in further detail below.

SUMMARY OF THE INVENTION

The above needs in the prior art are fulfilled by the present invention which is directed to an improved process for the graft polymerization of styrene and acrylonitrile type monomers onto a polychloroprene rubber latex which latex has been stabilized with a substance which inhibits the polymerization of these monomers. The process comprises polymerizing a styrene type monomer and a nitrile type monomer using latex polymerization methods wherein the improvement comprises carrying out the polymerization reaction in the presence of from 1 to 10 parts, per hundred parts of rubber, of latex seed particles using a chain transfer agent that does not inhibit the polymerization reaction.

DESCRIPTION OF THE PREFERRED EMBODIMENTS

The rubber latices which are grafted according to the methods of the present invention are those polychloroprene rubber latices which are stabilized or otherwise contain a substance which inhibits the polymerization of styrene and acrylonitrile type monomers which are to be grafted onto these rubbers. Examples of inhibiting substances found in these latices are ammonium soaps which are used to stabilize the latex. Examples of these include the saponification products of tall oil, rosin and fatty acids, etc. with ammonia.

The polychloroprene latices used have a particle size in the range of from 0.1 to 0.6 micron and preferably from 0.1 to 0.3 micron.

The polychloroprene rubbers used are chloroprene homopolymers and copolymers of chloroprene and at least one other monomer such as butadiene, acrylonitrile, methacrylonitrile, styrene, ring substituted halostyrene, alpha-halostyrene, ring substituted alkylstyrene, alpha-alkylstyrene, vinyl chloride, etc. The amount of comonomer used is in the range of 0 to 20 percent based on the weight of polychloroprene rubber copolymer.

Polychloroprene rubber latices or emulsions are commercially available from E. I. duPont de Nemours and Company and from the Petro-Tex Company. The chloroprene rubber used in the present invention is crosslinked either before or during processing in order to maintain its particulate nature.

The above rubbers in latex or emulsion form are readily grafted by dispersing the monomers into the latex or emulsion and then grafting such monomers onto the rubber using conventional latex or emulsion polymerization techniques. As used herein the expression latex is also used to include the expression emulsion.

The styrene type monomers used in the present invention include styrene, ring substituted alkylstyrenes such as o-, m-, and p-methylstyrene, -ethylstyrene, isopropylstyrene, -butylstyrene, -tertiary butylstyrene, alpha-alkyl styrenes, such as alpha-methylstyrene, alpha-ethylstyrene, ring substituted halostyrene, e.g., o-, m- and p-chlorostyrene, bromostyrene, fluorostyrene; various di, tri, tetra and penta substituted chlorostyrenes, bromostyrenes, and fluorostyrenes and various alpha- and beta-halosubstituted styrenes, e.g., alpha-chlorostyrenes, alpha-bromostyrenes, beta-chlorostyrenes, beta-bromostyrenes, and alpha-beta-halosubstituted styrenes and the like. Especially preferred monomers are styrene, alpha-methylstyrene and ring substituted chlorostyrene and bromostyrene.

The acrylonitrile type monomers used in the present invention include acrylonitrile, methacrylonitrile, ethacrylonitrile, and the like, with acrylonitrile and methacrylonitrile being preferred.

Either the styrene monomer or the nitrile monomer can be used in major proportions relative to one another in the copolymerization and/or grafting steps. Preferably, the amount of styrene monomer will be in the range of 15 to 85 percent by weight based on the total weight of styrene monomer and nitrile monomer. Correspondingly, the amount of the nitrile monomer will be in the range of 85 to 15 percent by weight. Especially preferred are monomer compositions containing from 60 to 80 percent styrene monomer and correspondingly from 40 to 20 percent acrylonitrile monomer.

The present invention requires the use of seed particles in latex form. When using a free radical initiator such as potassium persulfate from 1 to 10 parts by weight per hundred parts of rubber (pphr) of seed particles are used. When using redox initiators, the amount of seed particles used is in the range of from 3 to 20 parts per hundred parts of rubber. Preferably, the seed particles are prepared from a styrene type monomer and a nitrile type monomer of the types described above although other latex compositions can be used. Examples of such latices include SAN latices having a styrene content in the range of from 80 to 20 percent by weight; acrylic latices such as polymethylmethacrylate, polyacrylonitrile; rubber latices such as polybutadiene and the like. Preferably, the seed particles are of the same type and compositional ranges as those monomers being grafted onto the rubber substrate.

The average diameter of the seed particles, which should be smaller than the polychloroprene rubber to be grafted, is in the range of from 0.01 to 0.1 micron and preferably in the range of from 0.03 to 0.08 micron. Experience has shown that in order to obtain the desired graft level in the polychloroprene rubber substrate it is necessary to use seed particles having an average diameter which is less than the average diameter of the polychloroprene rubber.

The graft polymerization reaction wherein the styrene and acrylonitrile type monomers are grafted onto the rubber substrate is carried out in the presence of the SAN latex seed particles. Preferably, the seed particles are present in the rubber latex prior to the start of the graft polymerization reaction. Alternately, the seed particles are introduced into the polymerization reaction after polymerization has begun but before substantial graft polymerization has taken place, that is, before 25 percent of the monomers to be grafted onto the rubber substrate has been converted to polymer. In still another method, the monomers to be grafted and the seed particles are continuously added to the polymerization vessel.

The grafting of the styrene and the nitrile monomers onto the polychloroprene rubber is carried out using conventional latex graft polymerization techniques.

The polymerization initiators used in the present invention are free radical initiators such as potassium persulfate, benzoyl peroxide, cumene hydroperoxide, $\alpha$-cumyl peroxide, hydrogen peroxide, azobisisobutyronitrile and the like. Redox initiators such as diisopropylbenzene hydroperoxide, sodium formaldehyde sulfoxylate, persulfate-bisulfate, bisulfite-peroxide, and the like, may also be used.

Free radical initiators are preferred over the redox pairs because of their greater efficiency in the present process. The most preferred initiator is potassium persulfate.

The amount of the free radical initiator used will be in the range of from 0.3 to 2.0 parts per hundred parts of monomer (pphm).

The present invention uses chain transfer agents that do not inhibit the polymerization reaction. Examples of these chain transfer agents include tertiary dodecyl mercaptan, tertiary nonyl mercaptan, tertiary decyl mercaptan, tertiary undecyl mercaptan, normal dodecyl mercaptan, normal undecyl mercaptan, normal decyl mercaptan, normal nonyl mercaptan, and the like. Combinations of suitable chain transfer agents can also be used. The mercaptans are used over other conventional chain transfer agents such as terpinolene which tend to inhibit the graft polymerization reaction.

The graft polymerization reaction is carried out in order to obtain graft levels on the polychloroprene rubber of from 10 to 30 parts per hundred parts of rubber substrate (pphr) and a matrix polymer having a specific viscosity in the range of from 0.04 to 0.065, preferably 0.045 to 0.058, as measured in dimethyl formamide at 25° C. using a concentration of 0.05 grams of polymer in 50 milliliters (ml) of dimethyl formamide.

The following examples are set forth in illustration of the present invention and should not be construed as a limitation thereof. All parts and percentages given are by weight unless otherwise specified.

EXAMPLES 1 to 16

In the Examples the following graft polymerization process is used:

| Materials Charged | Parts (1) | |
|---|---|---|
| Polychloroprene rubber | 100 | |
| Monomers | | |
| Styrene | 93.8 | pph rubber |
| Acrylonitrile | 46.2 | pph rubber |
| Surfactant | 1 | pph rubber |
| Initiator (2) | — | pph monomer |
| t-dodecyl mercaptan (tDM) | 0.3–1.2 | pph monomer |
| SAN seed particles | 0–10 | pph rubber |
| Sodium lauryl sulfate | 2 | pph rubber |
| Water | | Adjusted to yield 30 to 40 percent by weight polymer |

(1) pph — parts per hundred.
(2) Examples 1 to 10 use 1.0 pphm of potassium persulfate; Examples 11 to 16 use 0.5 pphm of diisopropylbenzene hydroperoxide and 0.1 pphm of sodium formaldehyde sulfoxylate.

The polychloroprene rubber latex, the Dowfax 2Al, the SAN seed particles and the water are charged initially to the reaction vessel. The styrene and acrylonitrile monomers and tertiary dodecyl mercaptan are mixed and added continuously during the reaction for 2 hours, while the initiator is added continuously for 3 hours. After that, the reaction is allowed to proceed to about 95 percent conversion in about one half to one hour at 85° C. Half of the sodium lauryl sulfate is charged at 50 minutes and the other half at 1 hour 40 minutes after the reaction starts. Total polymerization time is about 4 hours and the final conversion of monomer to polymer is about 95 percent in each example.

The polychloroprene latex used is a chloroprene homopolymer which is commercially available from duPont de Nemours and Company as Neoprene. The latex which is stabilized with an ammonium soap, has a solids content of about 50 percent. The SAN particles, which are in latex form, have a particle size in the range of from 0.03 to 0.08 micron. The particles have a styrene content of about 70–80 percent by weight and an acrylonitrile content of about 30–20 percent by weight. The results of Examples 1 to 16, which are carried out using the procedure outlined above, are tabulated in Table I below.

TABLE I

SUMMARY OF EXAMPLES 1 to 16

| Ex. | Catalyst | tDM (1) pphm | SAN Seed | Matrix (2) SAN sp | Graft Level pphr |
|---|---|---|---|---|---|
| 1 | potassium persulfate | 0.4 | 0 | — | 41 |
| 2 | " " | 0.5 | 0 | 0.051 | 38 |
| 3 | " " | 0.8 | 0 | 0.045 | 32 |
| 4 | " " | 1.0 | 0 | — | 30 |
| 5 | " " | 1.2 | 0 | 0.043 | 29 |
| 6 | " " | 0.8 | 1.4 | 0.042 | 23 |
| 7 | " " | 0.8 | 4.2 | 0.047 | 14 |
| 8 | " " | 0.8 | 7 | 0.054 | 10 |
| 9 | " " | 0.6 | 3 | — | 20 |
| 10 | " " | 0.5 | 5 | — | 18 |
| 11 | redox catalyst (3) | 0.8 | 0 | 0.045 | 35 |
| 12 | " " | 0.9 | 0 | — | 32 |
| 13 | " " | 1.0 | 0 | — | 29 |
| 14 | " " | 1.2 | 0 | — | 29 |
| 15 | " " | 0.8 | 3 | — | 29 |
| 16 | " " | 0.8 | 5 | — | 27 |

(1) Tertiary dodecyl mercaptan transfer agent.
(2) The specific viscosity of the matrix polymer, i.e., the ungrafted polymer, which is formed during the graft polymerization reaction.
(3) Diisopropylbenzene hydroperoxide/sodium formaldehyde sulfoxylate redox pair.

Referring to Table I above, Control Examples 1 to 5 show that with increasing amounts of the mercaptan chain transfer agent, the graft level decreases as does the specific viscosity of the matrix polymer. However, in order to obtain a graft level below 30 more than one part of mercaptan must be used. This causes a lowering in the specific viscosity of the matrix polymer. Examples 6 to 10 indicate that the use of SAN seed particles provides a graft polymer with a level of graft in the range of from 10 to 23 parts without a significant decrease of the specific viscosity of the matrix polymer. Control Examples 11 to 14 illustrate that the graft level decreases with increasing amounts of the tertiary dodecyl mercaptan chain transfer agent when using a redox polymerization catalyst. This is substantially the same phenomena observed in Examples 1 to 8 when using potassium persulfate. Examples 15 and 16 show that the SAN seed particles decrease the graft levels. A comparison of Examples 15 and 16 with Examples 6 to 10 readily indicates that potassium persulfate used in Examples 6 to 10 is a more efficient polymerization initiator than the redox catalyst used in Examples 15 and 16 when considered in the framework of the present invention.

Some of the data from Table I are plotted in FIG. III. Curve B in FIG. III illustrates that, when using 0.5 pphm of tertiary dodecyl mercaptan, at least 1 pphr of SAN seed particles are required in order to obtain a graft level of less than 30 pphr. On the other hand, extrapolation of this curve would indicate that if greater than 10 pphr of SAN seed particles are used then the graft level may go below 10 pphr.

Curve C, which uses 0.8 pphm of tertiary dodecyl mercaptan chain transfer agent indicates that in order to obtain graft levels in the range of from 10 to 30 pphr then the amount of SAN seed particles used should be in the range of from 0.3 to 7.0 pphr.

Curve A shows the use of a redox type initiator. Comparison of Curve A with Curve B and C illustrates that the change in graft level as a function of the amount of seed particles is much greater when using potassium persulfate free radical initiator.

EXAMPLE 17 (CONTROL)

In another example the polymerization reaction was carried out using the redox polymerization initiator of Example 11, a polymerization temperature of 85° C. and 0.4 parts of tertiary dodecyl mercaptan and 0.4 parts of a terpinolene chain transfer agent. No seed particles were used in this example. The graft level and the specific viscosity of the matrix polymer were within the desired ranges. However, the conversion of monomer to polymer was only 77 percent as compared to the 95 percent conversion for Examples 1 to 16. The low conversion was attributed to the presence of the terpinolene chain transfer agent.

It is apparent from the above that many modifications and changes are possible without departing from the spirit and scope of the present invention.

What is claimed is:

1. In the process for grafting styrene-type monomers selected from the group consisting of styrene, alpha-methylstyrene and ring substituted chlorostyrene and bromostyrene and nitrile-type monomers selected from the group consisting of acrylonitrile and methacrylonitrile onto a polychloroprene latex which has been stabilized with a substance which inhibits the graft polymerization reaction using a mercaptan chain transfer agent, the improvement which comprises carrying out the graft polymerization reaction in the presence of from 1 to 10 parts of latex seed particles per hundred parts of polychloroprene rubber having an average particle size smaller than that of the polychloroprene latex particles to be grafted.

2. A process as in claim 1 wherein the polychloroprene latex has been stabilized with an ammonium based soap.

3. A process as in claim 1 wherein the chain transfer agent is tertiary dodecyl mercaptan.

4. A process as in claim 1 wherein the seed particles are poly(styrene-acrylonitrile) latex particles.

5. A process as in claim 1 wherein the polychloroprene latex to be grafted has a particle size in the range of from 0.1 to 0.6 micron.

6. A process as in claim 1 wherein the latex seed particles have a particle size in the range of from 0.03 to 0.08 micron.

7. In the process for grafting styrene-type monomers selected from the group consisting of styrene, alpha-methylstyrene and ring substituted chlorostyrene and bromostyrene and nitrile-type monomers selected from the group consisting of acrylonitrile and methacrylonitrile onto a polychloroprene latex having a particle size in the range of from 0.1 to 0.3 micron wherein the polychloroprene latex has been stabilized with an ammonium based soap, using a mercaptan chain transfer agent, the improvement which comprises carrying out the graft polymerization reaction in the presence of from 1 to 10 parts of poly(styreneacrylonitrile) latex seed particles per hundred parts of polychloroprene rubber wherein the latex seed particles have a particle size in the range of from 0.03 to 0.08 micron.

8. A process as in claim 7 wherein the styrene monomer is styrene.

9. A process as in claim 7 wherein the acrylonitrile monomer is acrylonitrile.

10. A process as in claim 7 wherein the polychloroprene rubber contains up to 20% by weight of a comonomer.

11. A composition made by the process of claim 1.

12. A composition made by the process of claim 7.

* * * * *